Dec. 31, 1946.  L. H. DRAEGER  2,413,488
WATER INJECTION SYSTEM FOR TRUCK TYPE CONCRETE MIXERS
Filed Sept. 11, 1944  4 Sheets-Sheet 3
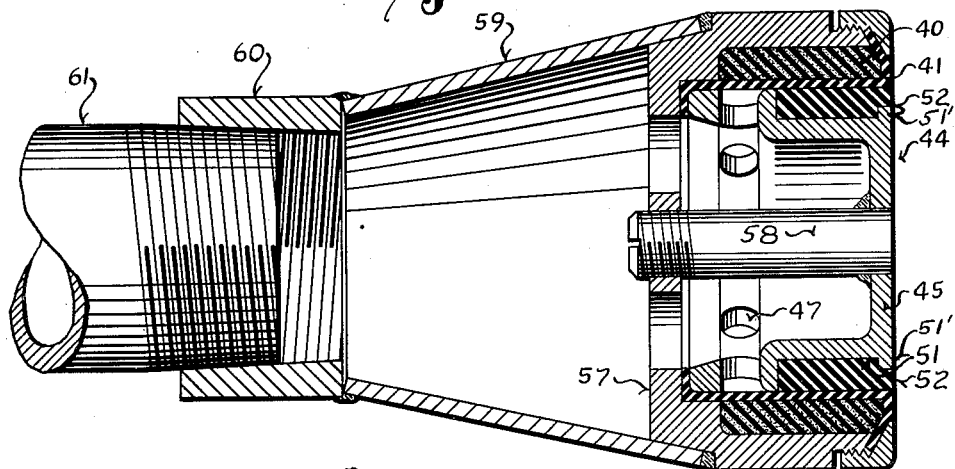
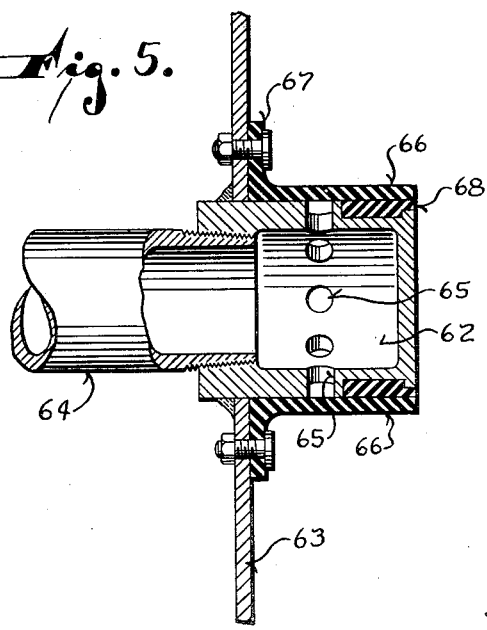
Inventor
Lloyd H. Draeger

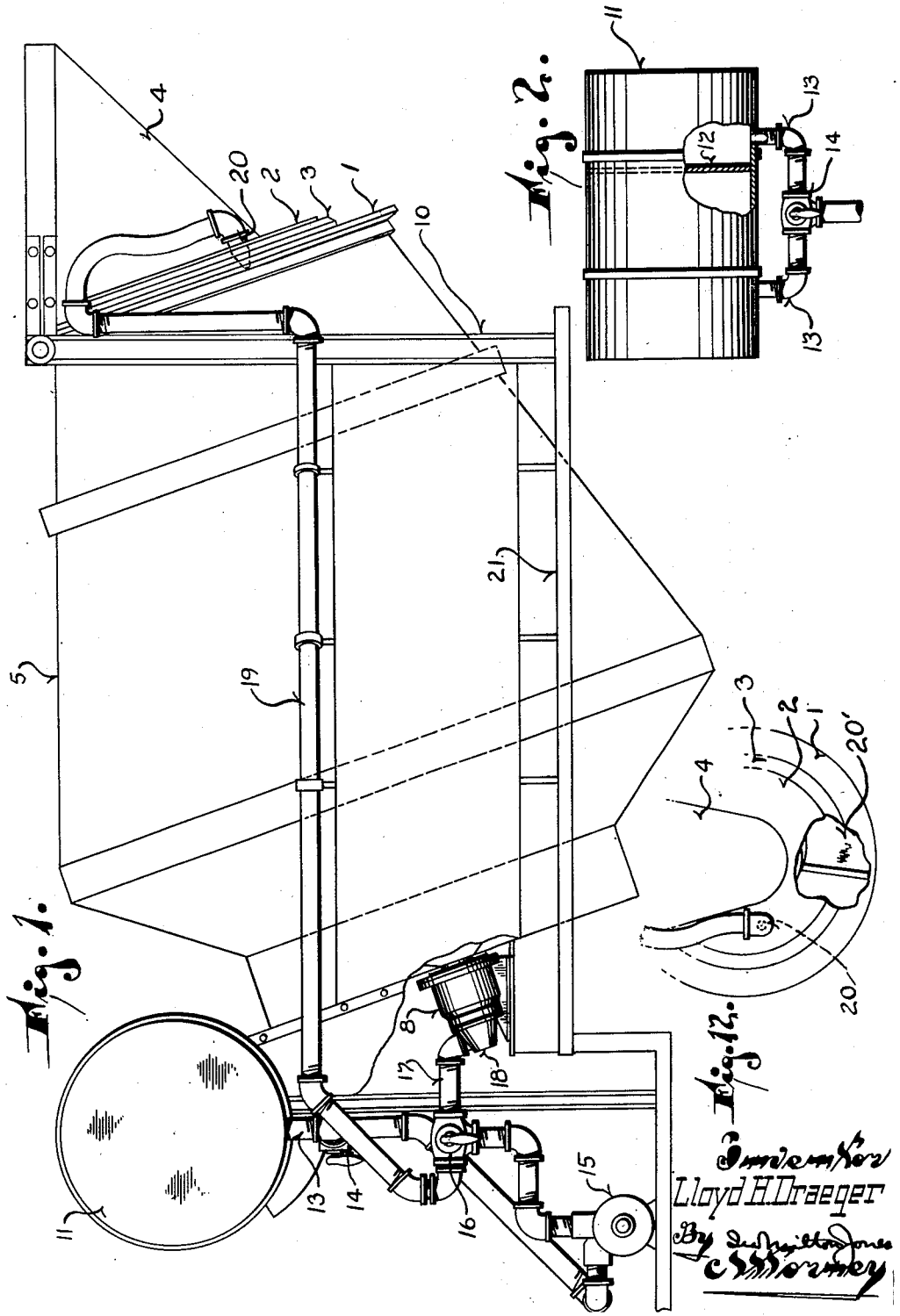

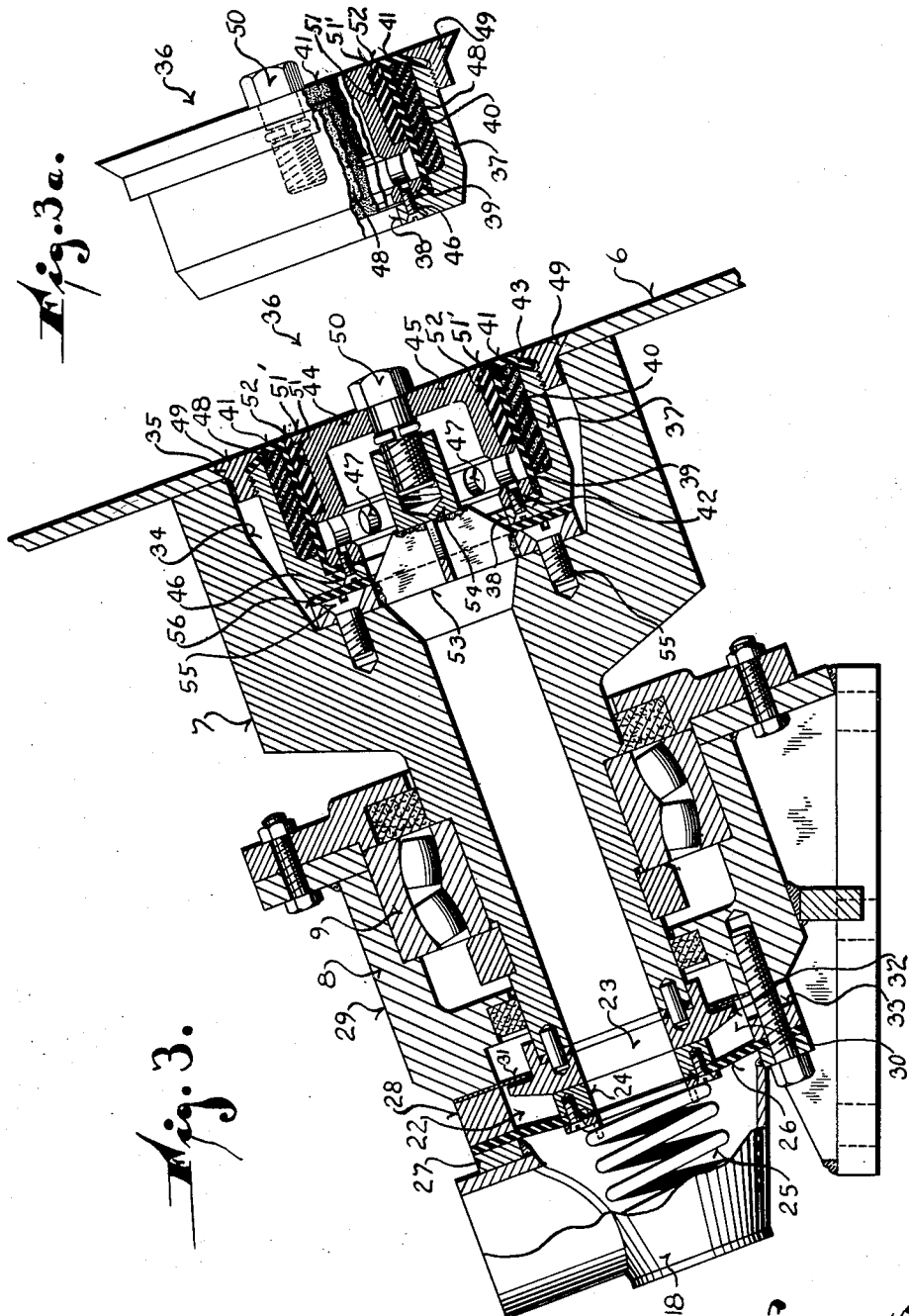

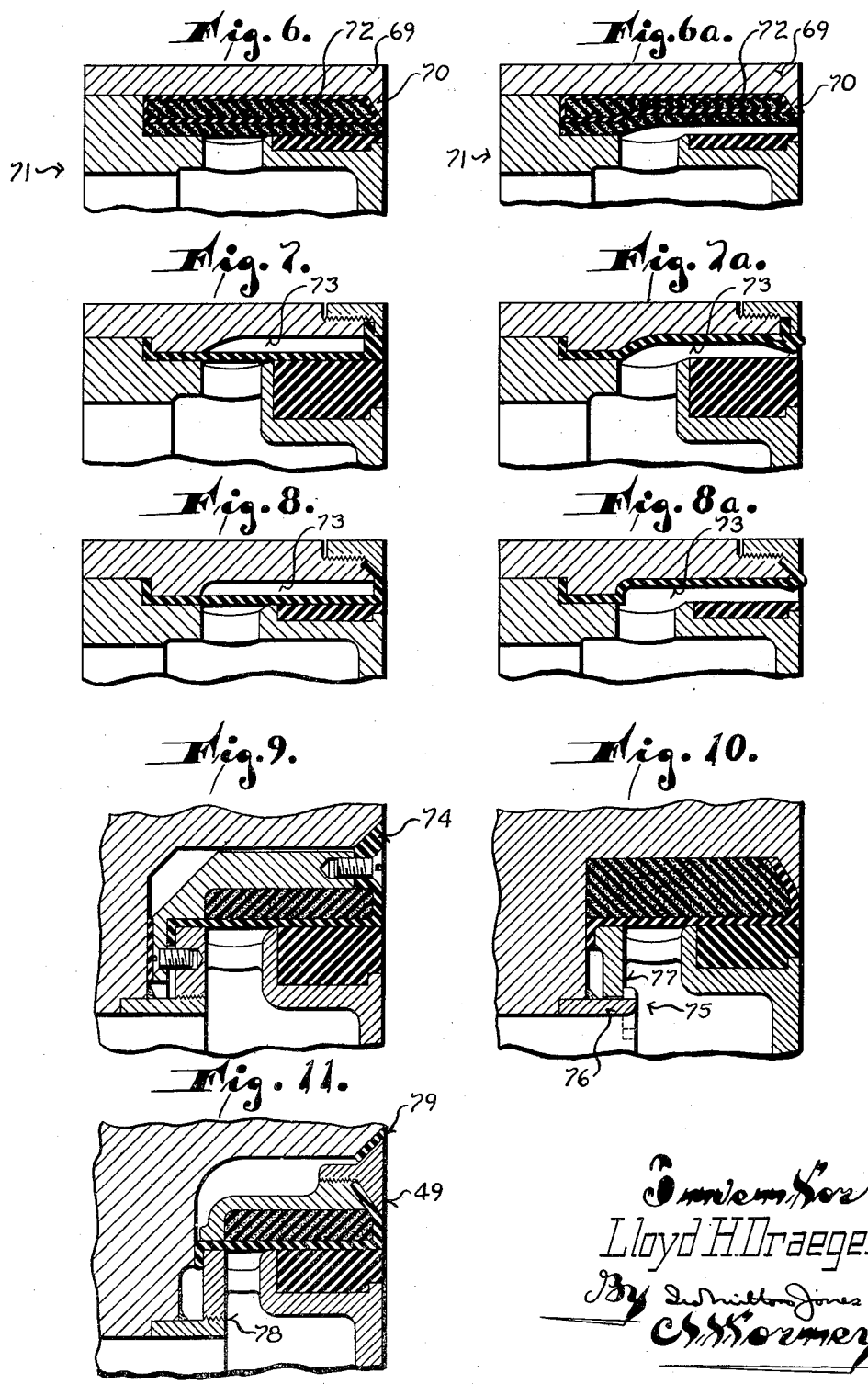

Patented Dec. 31, 1946

2,413,488

UNITED STATES PATENT OFFICE

2,413,488

WATER INJECTION SYSTEM FOR TRUCK TYPE CONCRETE MIXERS

Lloyd H. Draeger, Milwaukee, Wis., assignor to The T. L. Smith Company, Milwaukee, Wis., a corporation of Wisconsin Application September 11, 1944, Serial No. 553,500

17 Claims. (Cl. 259—168)

This invention relates to water injection systems for truck type concrete mixers. Truck mixers are used in different ways. They may be used to transport ready-mixed concrete from a central mixing plant to a place of use, or as a transit mixer, mixing the concrete en route, or as a mixer for mixing the concrete at the point of use. Each case has its own water injection problems.

If the mixer is used merely to transport ready-mixed concrete it is generally sufficient to provide only for wash water injection to clean the drum after its contents have been discharged. However, in some instances it may be necessary or desirable to add a small amount of water to the ready-mixed batch upon arrival at the job or just before it is discharged from the drum. This entails facilities not required in the mere introduction of wash water.

If the mixer is used to mix the concrete en route the water for the mixture may be injected into the drum in any suitable manner before the dry aggregates are introduced. The chief requirement is to provide means for introducing a measured quantity of water. The water inlet shown in the H. C. Peters et al. Patent No. 2,267,801, issued December 30, 1941, is an example of the type of water injection means that can be employed in this case.

Where the mixing must be done on location, but the dry aggregates are transported from a central batching plant, as in Government jobs where specifications require the mixing to be done under the surveillance of an inspector, the introduction of the mixing water presents the greatest difficulties, for as explained in the H. C. Peters Patent No. 2,338,820, issued January 11, 1944, efficient mixing under these conditions requires that the water be introduced at the closed end of the drum so as to create a wet zone directly thereat.

Provision of an adequate water injection system, therefore, has been a serious problem for the manufacturer of truck mixers, particularly as there is no way of knowing for what type of service the mixer will be employed. Water injection systems of the past have been relatively satisfactory for one use or another, but in each instance there were certain inherent deficiencies. For instance, while the scheme shown in Patent No. 2,267,801 is perfectly satisfactory for transit mixing where the water and dry aggregates are all fed into the drum at the same time, it is utterly inadequate for introducing water into the dry aggregates transported to the job from a central batching plant. Nor is it well adapted for injecting wash water due to its inability to direct the water against the discharge ends of the blades.

Again, the construction shown in Patent No. 2,338,820, as well as that of Patent No. 2,282,694 issued May 12, 1942, to C. F. Ball, wherein the water injection nozzle is positioned to be embedded in the batch and the water line extends down the center of the drum is objectionable because of the interference this construction presents to the charging of the drum and, what is more important, the exceedingly great difficulty keeping the water discharge opening free and unobstructed.

It is therefore an object of this invention to provide a water injection system for truck mixers which satisfactorily answers the requirements of all ways of using a truck mixer.

While some attention has been given the matter of providing washout facilities, no water injection system of the past has been entirely satisfactory in this respect. It is therefore another object of this invention to provide an improved manner of injecting wash water into the drum and whereby cleaning of the discharge ends of the mixing and conveying blades is assured.

As indicated hereinbefore, this invention contemplates a water injection system for truck mixers which provides effective water injection for all types of service to which a truck mixer is put. To this end it is a specific object of this invention to provide a water injection system for truck mixers which incorporates a two compartment water tank, a force pump and valved connections between the two compartments of the water tank and the pump and between the pump and two injection nozzles, one arranged to introduce water into the closed end of the drum and the other positioned to direct a cleaning spray directly onto the discharge ends of the blades.

This latter feature is especially valuable where transit mixing is being done and where a low slump concrete is being handled. In such cases the discharge ends of the blades are very apt to become encrusted with dry cement so that discharge of the drum contents is not effected as expeditiously as it should be. With the present invention this condition can be remedied by using the injection nozzle at the open end of the drum to introduce the water and create the desired wet zone at the closed lower end of the drum before the dry aggregates are charged into the drum, but holding back a small quantity of the measured volume of water until the place of use is reached. The operator can then inject the remaining water which washes the blades clean and assures rapid and proper discharge.

As noted hereinbefore, when the aggregates are transported dry and the mixing must be done on location, it is important and in fact essential in high discharge truck mixers where the drum is inclined, that the water be admitted directly adjacent to the closed lower end of the mixing drum. It is also desirable to have the water injection nozzle flush with the closed end of the drum so that free movement of the batch across the closed end of the drum is not interfered with and the water entering the drum is caused to flow over the inner surface of the closed end.

However, the introduction of the water in this manner makes the problem of excluding grout and particles of aggregate from the injection nozzle especially troublesome.

It is therefore another object of this invention to provide a fluid injection nozzle especially well adapted for use with truck type concrete mixers for introducing the water through the lower closed end of the drum without the danger of having particles of sand and other aggregate back up into the nozzle structure. To this end, it is a further object of this invention to provide a fluid injection nozzle in which the actual discharge occurs between two elastically deformable surfaces of substantial area.

In this connection it is another object of this invention to provide a fluid injection nozzle so designed that the discharge therefrom is in an annular stream issuing from between two elastically deformable ring-like members which are held in intimate contact by their inherent elasticity to be spread apart by fluid pressure.

With a view toward improving the action of the valve provided by the complementary ring-like members of elastically deformable material, it is also an object of this invention to have one of these members of relatively thin wall thickness but backed up by a resilient cushion.

Another object of this invention is to provide a water injection nozzle for truck type concrete mixers in which the valve mechanism of the injection nozzle is wholly located within a hollow trunnion projecting from the closed end of the drum, and wherein the valve mechanism is readily removable for repair and replacement from within the drum.

Another object of this invention is to provide an efficient fluid-tight seal between the rotating hollow trunnion and the water inlet which is so designed as to accommodate the inevitable wobbling movement of the trunnion.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate several complete examples of the physical embodiment of the invention constructed in accordance with the best modes so far devised for the practical application of the principles thereof, and in which:

Figure 1 is a side view of a truck type concrete mixer illustrating the application of this invention thereto;

Figure 2 is a front view of the water tank of the mixer, with a part broken away to show the manner in which it is partitioned off into compartments;

Figure 3 is an enlarged view in longitudinal section through the self-aligning bearing at the closed front end of the drum and through the water injection nozzle, to illustrate the manner in which the water is injected into the closed front end of the drum;

Figure 3A is a detail view partially in side elevation and partially in longitudinal section of the valve unit of the injection nozzle removed from the trunnion;

Figure 4 is a longitudinal sectional view through a water injection nozzle embodying a part of this invention, but designed for general utility;

Figure 5 is a longitudinal sectional view through a fluid injection nozzle for the closed front end of the drum, of slightly modified construction;

Figures 6, 7 and 8 and 6A, 7A and 8A are detail sectional views through different embodiments of this nozzle constructed in accordance with the present invention and respectively showing the valve in closed and open condition;

Figures 9, 10 and 11 are detail sectional views illustrating still other modifications of the nozzle at the closed end of the drum, but in each case showing its valve closed; and Figure 12 is a detail view showing part of the rear end of the drum to illustrate the position of the second water injection nozzle.

Referring now particularly to the accompanying drawings, in which like numerals indicate like parts, the numeral 5 designates the mixing drum of a truck type concrete mixer which, as is customary, is supported for rotation on an inclined axis and is equipped with spiral mixing and conveying blades. At its front end, which is lowermost, the drum is closed by an end wall 6 from which a trunnion 7 projects axially. The trunnion 7 is supported on the base 8 of the mixer frame by means of a self-aligning bearing 9. The opposite open end of the drum is rotatably supported by a bearing structure (not shown) carried by an upright portion 10 of the mixer frame.

As is well known, the drum is adapted to be charged and discharged through its open end by means of a charging hopper 4 movable between a charging position (shown in Figure 1) at which a closure disc or flange 3 encircling the hopper engages the open end of the drum to close the same, and a discharging position allowing the drum contents to be discharged through its open rear end. The closure disc or flange includes a stationary center part 2 and a rotatable outer ring 1 which bears against the edge of the drum and turns therewith.

Forwardly of the mixing drum the mixer frame mounts a water supply tank 11. This tank, as shown in Figure 2, has a partition 12 dividing it into two compartments each of which has a discharge pipe 13 leading therefrom. The two discharge pipes are connected to a three-way valve 14 by which either compartment of the tank may be connected with the inlet of a force pump 15. The outlet of the pump is connected by suitable piping to a three-way selector valve 16.

One outlet of the valve 16 is connected to the hollow trunnion 7 by a short pipe line 17 and a non-rotatable manifold 18. The other outlet of the valve 16 is connected by means of a long pipe line 19 to a nozzle 20 mounted on the stationary part 2 of the closure disc or flange 3 and projecting into the open rear end of the mixing drum. The pipe line 19 extends alongside the mixing drum and provides a handrail or guard at a convenient height above a catwalk 21 on the mixer frame; and as shown in Figure 12 the nozzle 20 is so positioned that its spray strikes the discharge ends of the spiral mixing and conveying blades, one of which is indicated at 20′ in Figure 12, at a point below the horizontal axis of the open end of the drum and on that side at which the blades are rising.

By having the nozzle 20 so positioned the stream issuing therefrom bathes or flushes the ends of the blades and then flows down along the blades to the closed front end of the drum thus affording assurance that the blades will be cleaned for their full length. This is especially advantageous where the mixer is used for transit mixing of low slump concerte as it allows the operator to "hold out" a little of the mixing water until arrival at the job and then inject the same through the nozzle 20, thereby washing any accumulation of concrete or cement off the discharge ends of the blades and insuring smooth and rapid discharge.

The hollow trunnion, being supported by the self-aligning bearing 9 and being rigid with respect to the mixing drum, will have a wobbling motion at its outer front end due to the rear end of the drum being moved laterally by the inevitable twisting and weaving of the truck chassis. To provide a fluid-tight juncture between the inlet manifold 18 and this front end of the hollow trunnion notwithstanding such wobbling, a novel seal, indicated generally by the numeral 22, is provided. This seal includes a ring 23 seated on the end of the trunnion and pinned against rotation with respect thereto. The front face of this ring is ground perfectly smooth and flat. Another non-rotatable ring 24 likewise provided with a ground face, is pressed against the ground front face of the ring 23 by a compression spring 25. A flexible diaphragm 26 is secured to the ring 24 and has its outer marginal portion clamped between the attaching flange 27 of the manifold 18 and a spacer 28 mounted on the end of the housing 29 of the bearing 9.

Thus it will be seen that although the front end of the hollow trunnion may wobble as it revolves, the ring 24 will always maintain firm engagement with the ring 23 on the end of the trunnion.

Also, it will be clear that all water or fluid entering the manifold 18 must pass through the rings 24 and 23 into the hollow trunnion. Any liquid which might possibly seep through the juncture between the rings 23 and 24 is caught in an annular chamber 30 back of the flexible diaphragm 26 and defined by the spacer 28 and a baffle 31 held in place between the spacer and the bearing housing 29.

It is to be observed that the ring 23 has an annular flange 32 projecting outwardly and overlying the baffle 31 and that the chamber 30 has a discharge port 33 in its bottom opposite this flange. Thus any liquid which might enter the chamber 30 is thrown out through the discharge port 33 and positively prevented from reaching the bearing.

The end of the trunnion 7 which is secured to the mixing drum, is enlarged and has a cavity 34 therein of a size to correspond to a hole 35 in the end wall 6 of the drum. Removably mounted in this cavity is a valve unit, indicated generally by the numeral 36. It is this valve unit which serves as the water injection nozzle or port for introducing the water into the lower closed front end of the mixing drum where the water must be introduced for successful mixing on location. While this valve unit is essentially an inlet nozzle for concrete mixers, with appropriate modification, as shown in Figures 4 and 5, it may be applied to a wide variety of purposes not necessarily associated with concrete mixing.

The valve unit 36 consists of a substantially cylindrical housing 37 twice counterbored to provide a small diameter inner end portion 38, a larger stepped portion 39 and a still larger annular pocket 40. An elastically deformable sleeve 41, preferably formed of rubber, is secured in the valve housing. Before being secured in position the longitudinal section of this sleeve is substantially Z-shaped, having an inwardly directed flange 42 at one end and an outwardly directed flange 43 at its other end with the body of the sleeve cylindrical and of an outside diameter such as to just fit in the stepped portion 39. Hence, its inwardly directed flange 42 overlies the bottom of the second counterbore where it is clamped in place by a barrel-like valve seat member 44.

This barrel-like member 44 is substantially a hollow cylinder having its inner end open but its outer end closed by an end wall 45. Screws 46 hold the member 44 assembled with the valve housing with the flange 42 clamped therebetween as noted.

The outer diameter of the member 44 is such as to be snugly engaged by the inside of the sleeve 41. Thus a plurality of discharge ports 47 through the side wall of the member 44 are normally closed by the sleeve 41. It is to be observed that these discharge ports 47 are positioned opposite the inner end of the annular pocket 40 so that fluid pressure inside the hollow member 44 and acting through the ports 47 may displace the sleeve 41 outwardly into the pocket 40.

Preferably the pocket 40 contains a resilient cushion 48 of sponge rubber or the like, which backs up the thin walled sleeve to resist fluid pressure and insure the sleeve normally maintaining cylindrical formation. The cushion 48 is held in place in back of the sleeve by clamping the outwardly directed flange 43 of the sleeve between the end of the housing and a clamping ring 49 threaded or otherwise secured to the housing.

It is to be observed that this clamping ring, in addition to overlying the flange 43, also has an outwardly directed beveled flange to snugly fit the mouth of the hole 35 in the wall 6. The axial dimensions of the housing and valve seat member 44 are such that the outer face of the clamping ring 49 is flush with or on substantially the same plane as the outer face of the end wall of the member 44. Thus when the valve unit is in its cavity 34 where it is removably held by a screw 50, the entire valve unit is flush with the inner face of the end wall 6.

While the outer diameter of the valve seat member 44 may be uniform for its entire length, it is preferably stepped as at 51 to provide an annular space in which an elastically deformable collar 52 is located. This collar is permanently adhered or otherwise secured to the valve seat member 44 and extends to the outer surface of the end wall 45. To positively guard against displacement of the collar 52, the outer end of the step has an annular shoulder 51′ over which the collar must be stretched during application.

Being of the same outer diameter as the member 44 at its place where the ports 47 are located, it follows that the elastically deformable collar 52 has intimate cylindrical surface-to-surface engagement with the sleeve 41. In fact, the collar 52 and the sleeve 41 comprise the two elements between which the fluid issues, and these two elements are normally held in intimate surface-to-surface engagement by their inherent elasticity. Because of their elasticity any small particles of foreign matter that might work their way between the sleeve 41 and the collar 52 will be accommodated without creating an open space between the collar and sleeve.

It is also to be observed that the collar 52 is axially shorter than the sleeve. The inner end of the sleeve thus overhangs the collar so that by the application of fluid pressure within this overhanging end of the sleeve, the sleeve will be expanded and the fluid will flow in an annular stream between the sleeve and the collar.

To enable the screw 50 to removably hold the valve unit in place, a spider 53 is secured in the bottom of the cavity 34. The arms of this spider support a hub 54 into which the screw 50 is threaded, the screw being preferably provided with a snap ring to prevent detachment thereof from the valve unit. The spider is secured in the bottom of the cavity by screws 55 which pass through its outer flange and are threaded into the body of the trunnion. A gasket 56 is preferably located between the outer flange of the spider and the inner end of the valve housing to prevent leakage around the housing.

While specifically designed to be used in a concrete mixer, the injection nozzle 36 may be applied to other kindred purposes, and in Figures 4 and 5 two ways of using the nozzle for general utility are illustrated. In Figure 4 the actual nozzle construction is identical with that illustrated in Figures 3 and 3A except that the valve housing is itself provided with a spider 57, the hub of which is tapped to receive a screw 58 fixed to the closed end wall 45 of the valve seat member 44.

The manner of mounting the nozzle is, of course, also different and for this purpose the valve body has a conical pipe section 59 welded thereto, to the outer end of which a nipple 60 is secured. The nipple 60 has a pipe tap to receive the end of a supply pipe 61. To enable removal of the valve unit from the valve housing it is of course necessary that the entire nozzle be removed from the pipe 61 so that access may be had to the screw 58.

The construction shown in Figure 5 consists merely of an inner hollow barrel-like member 62 which may be welded to the wall 63 of a receptacle into which the fluid is to be injected. A supply pipe 64 threads directly into this member 62. The cylindrical side wall of the member 62 has discharge ports 65 which are covered by an elastically deformable sleeve 66. The sleeve 66 is directly secured to the wall 63 by having a flange 67 thereof bolted to the wall.

As in the construction previously described, the member 62 has its end portion stepped to accommodate a collar 68 of elastically deformable material so that the fluid issues from between the sleeve 66 and the collar.

The various embodiments of the invention illustrated in Figures 6 to 11, inclusive, are perhaps all quite clear from the preceding description, for in each instance the distinction resides primarily only in the way in which the various parts are assembled. However, a brief description of these several modifications follows.

In Figures 6 and 6A the valve housing 69 has a uniform diameter bore for its entire length with the exception of the extreme front where a flange 70 extends inwardly. The removable valve unit 71 is thus insertable from the rear. Its construction is substantially like that previously described, but in this case the insertion of the valve unit into the housing 69 holds the outer elastically deformable member 72 in place.

In Figures 7, 7A, 8 and 8A the primary distinction over the construction shown in Figures 3 and 3A resides in the omission of the resilient cushion in back of the thin walled sleeve. In this case the valve housing is merely provided with an enlarged cavity 73 into which the elastically deformable sleeve is expanded by fluid pressure as shown in Figures 7A and 8A.

In Figure 9 the sleeve has an integral heavy flange 74 which obviates the need for the clamping ring of the construction shown in Figures 3 and 3A.

In Figure 10 the removable valve unit is held in place by a bayonet slot construction, indicated generally by the numeral 75 and which comprises an outwardly flanged ring 76 welded to the valve housing with its flange overlying an inwardly directed flange 77 on the valve seat member, the flange and ring being provided with the usual gateways to permit assembly of the parts.

In Figure 11 the inwardly directed flange on the elastically deformable sleeve provides a gasket to take the place of the gasket 56, and the securement of the removable valve unit is by means of a threaded connection 78. In addition, the clamping ring 49 has a rubber washer 79 interposed between it and the periphery of the cavity in which the valve unit is mounted.

From the foregoing description, taken in connection with the accompanying drawings, it will be readily apparent to those skilled in the art, that this invention provides a water injection system for use in truck type concrete mixers which fully satisfies the requirements of all possible uses of such mixers.

It will also be understood by those skilled in the art, that while the elastically deformable elements, namely, the sleeve 41 and the collar 52, of the nozzle at the closed front end of the drum are preferably formed of rubber, any other suitable and equivalent material may be employed. However, a necessary qualification of the material used is that it be sufficiently elastic and yielding to accommodate any small piece of grout or sand that might work its way into the annular water passage between the sleeve 41 and the collar 52 without causing the sleeve 41 and collar 52 to stand apart.

What I claim as my invention is:

1. A fluid injection nozzle comprising: complementary non-yieldable inner and outer members in telescoped relation having their adjacent surfaces spaced apart to provide a fluid passage therebetween and parallel with their axes; elastically yieldable linings for said surfaces normally maintained in contact with each other to close the fluid passage subject to being opened by fluid pressure spreading the linings apart; and means for mounting said members and for conducting fluid under pressure to one end of the fluid passage.

2. A fluid injection nozzle comprising: a hollow, substantially cylindrical member having a discharge port through the side wall thereof; an elastically deformable collar encircling said hollow member and covering at least part of the side wall thereof; an elastically deformable sleeve encircling the hollow member and having intimate contact with said elastically deformable collar, a portion of the sleeve extending across the discharge port to close the same; and means for conducting fluid under pressure to the interior of said hollow member for discharge through said port and between the collar and sleeve whenever the pressure exceeds the elasticity with which the sleeve and collar normally maintain contact.

3. In a fluid injection nozzle the combination of: complementary telescoped inner and outer substantially cylindrical, elastically deformable members maintained in cylindrical surface-to-surface engagement by the inherent elasticity thereof; a fluid supply duct; means mounting said complementary inner and outer members on the end of the fluid supply duct, said means cooperating with the complementary members to close the end of the supply duct except for a discharge passage established by radial separation of the cylindrical surfaces of the complementary members in response to fluid pressure applied to the juncture of said members from inside the supply duct; and means for conducting fluid under pressure to the supply duct to issue from between said complementary inner and outer members whenever the pressure of the fluid exceeds the elasticity with which the members are held in intimate contact.

4. In a fluid injection nozzle the combination of: complementary inner and outer elastically deformable members having substantially cylindrical surfaces held in intimate contact by the inherent elasticity thereof, said contacting surfaces having substantial axial length but the inner member being axially shorter than the outer member so that the outer member overhangs the inner member at one end; means mounting said inner and outer members and holding the same in assembled relationship; and means for conducting fluid under pressure to the overhanging end of said outer member to issue from between the inner and outer members whenever the fluid pressure exceeds the elasticity with which the members are held in contact.

5. In a fluid injection nozzle the combination of: complementary inner and outer substantially cylindrical, elastically deformable members maintained in cylindrical surface-to-surface engagement by the inherent elasticity thereof; means mounting said complementary inner and outer members and maintaining the same in assembled relationship; means for conducting fluid under pressure to the juncture between said complementary inner and outer members to issue from between said members whenever the pressure of the fluid exceeds the elasticity with which the members are held in intimate contact, one of said members having a thinner wall section than the other; and a resilient cushion backing up said thin wall section.

6. In a fluid injection nozzle the combination of: complementary inner and outer elastically deformable members having substantially cylindrical surfaces held in intimate contact by the inherent elasticity thereof, said substantially cylindrical contacting surfaces having substantial axial length but the inner member being axially shorter than the outer member so that the outer member overhangs said inner member at one end; means mounting said inner and outer members and holding the same in assembled relationship, the outer member having a thin wall section; a resilient cushion surrounding and backing up the outer member; and means for conducting fluid under pressure to the overhanging end of said outer member to issue from between the inner and outer members whenever the fluid pressure exceeds the elasticity with which the members are held in contact.

7. In a fluid injection nozzle the combination of: an inner hollow metal valve seat having an outer substantially cylindrical wall; a discharge port opening through said wall; an elastically deformable collar mounted on and encircling said substantially cylindrical wall of the valve seat forwardly of the discharge port; a valve housing in which the valve seat is mounted, said valve housing having a substantially cylindrical inner wall relieved opposite the discharge port; an elastically deformable sleeve in said valve housing hugging the substantially cylindrical outer surface of the valve seat and the collar and closing the discharge port; and means for conducting fluid under pressure into the hollow valve seat for discharge through said port from between the collar and sleeve whenever the fluid pressure exceeds the elasticity with which said sleeve closes the port.

8. In a fluid injection nozzle the combination of: an inner hollow metal valve seat having an outer substantially cylindrical wall; a discharge port opening through said wall; an elastically deformable collar mounted on and encircling said substantially cylindrical wall of the valve seat forwardly of the discharge port; a valve housing in which the valve seat is mounted, said valve housing having a substantially cylindrical inner wall; an elastically deformable sleeve in said valve housing hugging the substantially cylindrical outer surface of the valve seat and the collar and closing the discharge port; and means for conducting fluid under pressure into the hollow valve seat for discharge through said port and from between the collar and sleeve whenever the fluid pressure exceeds the elasticity with which said sleeve closes the port, the valve housing having a portion of its inner substantially cylindrical wall counterbored in back of the sleeve to provide space into which said sleeve may be expanded by fluid pressure.

9. In a fluid injection nozzle the combination of: an inner hollow metal valve seat having an outer substantially cylindrical wall; a discharge port opening through said wall; an elastically deformable collar mounted on and encircling said substantially cylindrical wall of the valve seat forwardly of the discharge port; a valve housing in which the valve seat is mounted, said valve housing having a substantally cylindrical inner wall; an elastically deformable sleeve in said valve housing hugging the substantially cylindrical outer surface of the valve seat and the collar and closing the discharge port; means for conducting fluid under pressure into the hollow valve seat for discharge through said port and from between the collar and sleeve whenever the fluid pressure exceeds the elasticity with which said sleeve closes the port, the valve housing having a portion of its inner substantially cylindrical wall counterbored in back of the sleeve to provide space into which said sleeve may be expanded by fluid pressure; and a resilient cushion filling said space and resiliently backing up the sleeve.

10. In a fluid injection nozzle the combination of: a tubular supply duct; a substantially cylindrical, elastically deformable sleeve inside one end of the duct and having its ends fixed with respect to the duct while its medial portion is free; a hollow, substantially cylindrical member within said duct inside the sleeve, said hollow member having its outer end closed and its inner end open to the supply duct, the wall of the hollow member being snugly engaged by the sleeve; a port through said substantially cylindrical wall closed by the sleeve, subject to being opened by fluid pressure within the hollow member supplied from the duct; and means for supplying fluid under pressure to the duct.

11. A fluid injection nozzle comprising: a supply duct; a valve housing within the duct; an elastically deformable sleeve within the valve housing; a hollow, barrel-like valve seat inside the sleeve with its side wall snugly engaged by the sleeve and an end wall substantially flush with the discharge end of the duct, the side wall of the valve seat having discharge ports therethrough closed by the sleeve, subject to being opened by fluid pressure inside the sleeve; an elastically deformable collar encircling the valve seat outwardly of the ports and snugly engaged by the sleeve, said collar and sleeve cooperating to define a fluid seal held closed by the elasticity of the collar and sleeve, subject to being opened by fluid pressure inside the sleeve; means for removably securing the valve seat and housing assembly in the supply duct with the mouth of the fluid seal formed by the juncture of the collar and sleeve substantially flush with the discharge end of the duct; and means for conducting fluid under pressure to said duct.

12. In a truck type concrete mixer having a mixing drum closed at one end and open at the other, provided with mixing and conveying blades and rotatable on an inclined axis with its closed end lowermost, a water injection system comprising: an injection nozzle opening through the closed end wall of the mixing drum for introducing water into the lower closed end of the drum at a point lying beneath the surface of the aggregates within the drum to produce a wet zone at said closed end of the drum; another injection nozzle mounted adjacent to the open end of the drum and positioned to direct a stream against the discharge ends of the blades; a water tank; a pump; means connecting the pump with the outlet of the tank; a selector valve located adjacent to the closed end of the drum in a position readily accessible to the operator of the mixer, said selector valve having its inlet connected with the pump so as to receive water under pressure from the pump, said valve having two outlets each selectively connectible with its inlet; duct means connecting one of the valve outlets with the injection nozzle which opens through the closed end wall of the drum; and other duct means for connecting the other outlet of the selector valve with the injection nozzle positioned to direct a stream against the discharge ends of the blades.

13. In a concrete mixer: a rotatable mixing drum closed at one end and open at its other end; means mounting the drum for rotation on an incliined axis with its open end raised, said drum having spiral mixing blades which force the materials engaged thereby towards the closed end of the drum during rotation of the drum in one direction; a closure for the open end of the drum; and water injection means carried by said closure for injecting water into the open end of the drum and having its discharge at a point beneath the horizontal axis of the open end of the drum in line with the path of the ends of the spiral blades as they move with the drum and at that side of the drum at which the blades are rising during rotation of the drum in said direction so that water discharging into the drum through its open end strikes the adjacent ends of the blades and flows down along the ascending blades toward the closed end of the drum.

14. In a concrete mixer having a rotatable mixing drum with a wall closing one end thereof, means for introducing water into the interior of the drum through its closed end, comprising: a hollow trunnion fixed to the exterior of said end wall with its hollow interior communicating with the interior of the drum through an opening in said end wall; means for supplying water under pressure to the hollow trunnion for injection into the interior of the drum; and valve means for controlling communication between the interiors of the drum and trunnion, said valve means having cooperating relatively movable members normally in engagement to close the valve but separating in response to water pressure inside the trunnion to permit water to be injected into the drum, reengagement of said members in the absence of water pressure within the trunnion preventing seepage of liquids out of the drum past the valve means, and said valve means having the edges of its relatively movable members which define the mouth of the discharge opening into the drum substantially flush with the inner surface of said end wall of the drum to enable unrestricted movement of the drum contents over said edges to thereby keep the same free from encrustations which might interfere with water discharge into the drum.

15. In a concrete mixer having a rotatable mixing drum with a wall closing one end thereof, means for introducing water into the drum through said end wall thereof comprising: a hollow trunnion fixed to the exterior of the end wall of the drum on the axis thereof to provide means by which one end of the drum may be rotatably mounted, the hollow interior of the trunnion communicating with the interior of the drum through an axial opening in the end wall of the drum; means for supplying water under pressure to the interior of the hollow trunnion for injection into the drum; and pressure responsive valve means in the hollow interior of the trunnion for controlling communication between the interiors of the trunnion and drum, said valve means having cooperating relatively movable members normally seated on each other to close off communication between the interiors of the hollow trunnion and drum, but unseating in response to water pressure inside the trunnion, said cooperating members having portions which define the mouth of the discharge opening into the drum disposed substantially flush with the surrounding portion of the inner surface of the end wall of the drum so as to enable unrestricted movement of the drum contents thereover to thus preclude the building up of encrustations at the mouth of the discharge opening into the drum.

16. A fluid injection nozzle, comprising: complementary non-yieldable inner and outer members in telescoped relation having their adjacent surfaces spaced apart, the inner member having a cup-like shape with a discharge port in its side wall opening to said space between the members; an elastically deformable sleeve in said space and telescoped over the side wall of the inner member in intimate contact therewith and closing the discharge port therein, fluid pressure applied to the interior of the cup-like inner member expanding said sleeve against the resiliency thereof away from the side wall of the inner member against the outer member to establish an axial fluid passageway lying between the inner member and sleeve through which fluid discharges from the nozzle; and means on said telescoped members remote from the closed end of the hollow inner member cooperating to hold the sleeve in position on the inner member against displacement therefrom with the sleeve sealing the adjacent portion of said passageway so that fluid discharges from one end of said passageway adjacent to the closed end of the inner member.

17. A fluid injection nozzle comprising: a hollow rigid member closed at one axial extremity and open at its other extremity, said member having a discharge port opening through its side wall remote from the closed outer extremity of the member; an elastically deformable collar encircling the side wall of the hollow member between the closed outer extremity thereof and said discharge port; a sleeve of elastically deformable material encircling the hollow member and having intimate contact with said collar, a portion of the sleeve extending across said discharge port to close the same, fluid pressure applied to the interior of the hollow member acting to expand said sleeve against the resiliency thereof to establish a fluid passageway between the sleeve and collar; and a sealing connection between the sleeve and the hollow member for holding the inner end of the passageway closed and so that the final discharge for fluid therefrom is at the outer extremities of the sleeve and collar; the length of the passageway between the discharge port and the outer extremities of the sleeve and collar causing fluid pressure in the passageway to be less at the outer extremity of the passageway than at the discharge port so that the outer extremity of the sleeve is caused to contract and seal against the adjacent portions of the collar under diminishing pressure at the discharge port prior to closure of the discharge port by the sleeve.

LLOYD H. DRAEGER.